(12) United States Patent
Shadwell et al.

(10) Patent No.: US 10,486,875 B2
(45) Date of Patent: *Nov. 26, 2019

(54) COLLATING STRIP FOR PLUG AND PLUG INSTALLATION METHOD

(71) Applicant: Handy & Harman, New York, NY (US)

(72) Inventors: Peter J. Shadwell, Longmeadow, MA (US); Richard L. Belinda, Westfield, MA (US); Timothy F. Gillis, Florence, MA (US)

(73) Assignee: Handy & Harman, White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/034,613

(22) Filed: Jul. 13, 2018

(65) Prior Publication Data
US 2018/0334299 A1 Nov. 22, 2018

Related U.S. Application Data

(63) Continuation of application No. 14/434,251, filed as application No. PCT/US2013/064017 on Oct. 9, 2013, now Pat. No. 10,023,373.

(60) Provisional application No. 61/711,244, filed on Oct. 9, 2012, provisional application No. 61/782,549, filed on Mar. 14, 2013.

(51) Int. Cl.
*B65D 85/24* (2006.01)
*B65D 73/00* (2006.01)
*B25C 7/00* (2006.01)
*B65D 59/02* (2006.01)
*F16B 27/00* (2006.01)

(52) U.S. Cl.
CPC ............ *B65D 73/0035* (2013.01); *B25C 7/00* (2013.01); *B65D 59/02* (2013.01); *F16B 27/00* (2013.01)

(58) Field of Classification Search
CPC ...... B65D 59/02; B65D 73/0035; B25C 7/00; F16B 27/00; A47B 57/06; A47B 95/04; Y10S 206/82
USPC ....... 206/338, 340, 341, 343, 345–348, 486, 206/490, 820; 411/372.5, 373, 377, 369, 411/371.1, 508, 908; 220/787; 52/220.1, 52/220.8, 300, 301, 302.5, 302.7
See application file for complete search history.

(56) References Cited

U.S. PATENT DOCUMENTS

| | | |
|---|---|---|
| 293,726 A | 2/1884 | Fancher |
| 2,302,045 A | 11/1942 | Neumann et al. |

(Continued)

OTHER PUBLICATIONS

International Search Report and Written Opinion dated Jan. 17, 2014 (PCT/US2013/064017).

(Continued)

*Primary Examiner* — Luan K Bui
(74) *Attorney, Agent, or Firm* — Alix, Yale & Ristas, LLP

(57) ABSTRACT

A collating strip for holding plugs prior to insertion of the plugs into a hole such as a screw hole or nail hole after the screw or nail has been driven. The collating strip comprises an elongated strip having a plurality of perforations spaced along its length; and a plug positioned in each of the perforations, each plug having an insertion end and an external end, the insertion ends projecting from said strip. The strips may be in sheet form of a plurality of strips side by side with an individual strip being separable from the remaining strips of the sheet.

19 Claims, 9 Drawing Sheets

(56) References Cited

U.S. PATENT DOCUMENTS

| | | | | |
|---|---|---|---|---|
| 3,083,429 | A | * | 4/1963 | Barlow .............. A44B 17/0058 206/345 |
| 3,165,968 | A | * | 1/1965 | Anstett .................. F16B 15/08 206/343 |
| 3,578,200 | A | | 5/1971 | Hetzer |
| 3,707,226 | A | * | 12/1972 | Wippermann ......... A47B 57/06 206/343 |
| 3,938,657 | A | * | 2/1976 | David ..................... B21J 15/32 206/343 |
| 3,955,674 | A | * | 5/1976 | Maier ...................... B25C 3/00 206/347 |
| 4,018,334 | A | | 4/1977 | Lejdegard |
| 4,201,296 | A | * | 5/1980 | Hrabik .................. B65D 81/24 206/205 |
| 4,823,978 | A | * | 4/1989 | Pufpaff .................. E04F 19/00 220/787 |
| 5,047,273 | A | * | 9/1991 | Ernst-Cox ............. A47B 95/00 206/307 |
| 5,112,175 | A | | 5/1992 | Wilkening |
| 5,470,184 | A | * | 11/1995 | Chandler ............. A47B 95/043 411/377 |
| 5,499,737 | A | * | 3/1996 | Kraus .................. F16B 21/086 138/89 |
| 5,509,768 | A | | 4/1996 | Hon |
| 5,931,298 | A | | 8/1999 | Huang |
| 5,984,096 | A | | 11/1999 | Shinjo |
| 6,047,738 | A | | 4/2000 | Andersson et al. |
| 6,116,835 | A | | 9/2000 | Blacket et al. |
| 6,745,530 | B2 | | 6/2004 | Nesbitt |
| 6,832,696 | B2 | | 12/2004 | Donner |
| 6,974,030 | B1 | | 12/2005 | Sundstrom |
| 7,090,077 | B2 | * | 8/2006 | Pally ....................... F16B 27/00 206/347 |
| 7,520,385 | B2 | | 4/2009 | Yu et al. |
| 7,581,361 | B1 | | 9/2009 | Murkland |
| 8,919,606 | B2 | | 12/2014 | Sato |
| 2003/0127346 | A1 | * | 7/2003 | Chen ..................... B65D 85/24 206/346 |
| 2006/0006087 | A1 | * | 1/2006 | Lin ......................... F16B 15/08 206/347 |
| 2006/0201957 | A1 | | 9/2006 | Harrington et al. |
| 2007/0144924 | A1 | | 6/2007 | Yamashita |
| 2009/0188822 | A1 | | 7/2009 | Searle et al. |
| 2012/0292212 | A1 | * | 11/2012 | Lin ......................... F16B 27/00 206/347 |

OTHER PUBLICATIONS

Supplementary European Search Report dated Aug. 17, 2016 (European Application No. 13845133.1).

\* cited by examiner

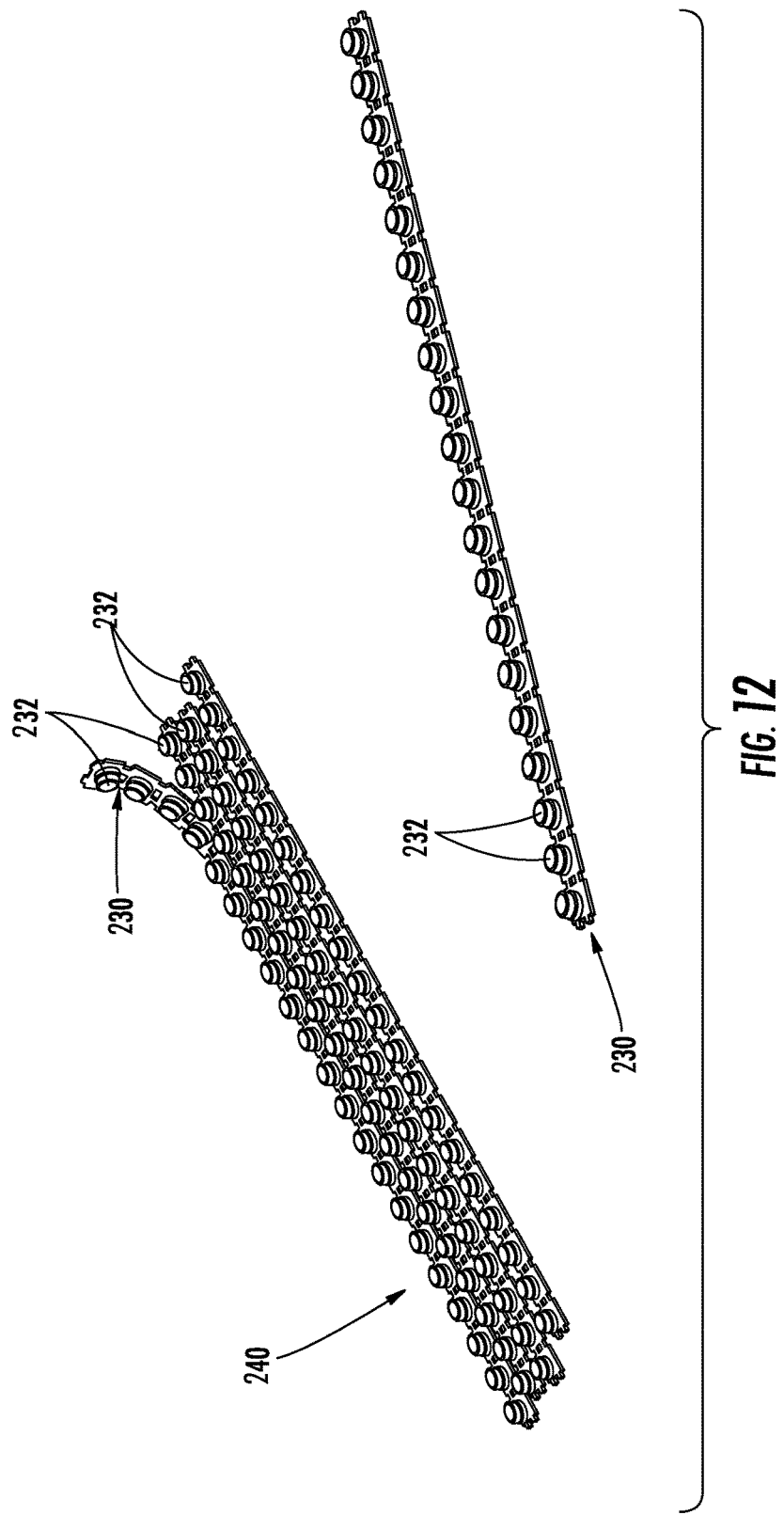

COLLATING STRIP FOR PLUG AND PLUG INSTALLATION METHOD

CROSS-REFERENCE TO RELATED APPLICATIONS

This application is a continuation of U.S. patent application Ser. No. 14/434,251, filed Apr. 8, 2015, which claims the priority of U.S. Provisional Application No. 61/711,244 filed Oct. 9, 2012 and U.S. Provisional Application No. 61/782,549 filed Mar. 14, 2013, the entire disclosures of which applications are incorporated herein by reference in their entirety.

FIELD OF THE INVENTION

The invention relates to plugs for filling recesses left by attachment openings in a surface, such as a screw or nail hole in trim, sheathing or a like item. More particularly, the invention relates to a collating strip to hold a plurality of plugs, a sheet of multiple collating strips and an automatic or semi-automatic method of installing plugs from the strip.

BACKGROUND

Plugs are commonly used to conceal holes formed for attaching trim or a similar building material with attachment holes (decking, sheathing, furniture, etc.). Numerous loose plugs are packaged together in a bag for individual handling and insertion into an attachment hole. This known method of packaging and handling carries numerous drawbacks. For example, the relatively small sized plugs are easily dropped and/or lost, attract dirt from one's fingertips, are challenging to position into a flush hole with one's fingertips, are difficult to isolate prior to use and are often difficult to position with proper grain orientation in the trim material. It would be useful to have a storage and delivery system that allows a quick and facile positioning, orientation and insertion of plugs with minimal or no direct handling of the individual plugs.

SUMMARY

In one embodiment, a strip of plugs configured for insertion into a hole in a surface includes a substrate and a plurality of plugs. The substrate defines a first side and an opposite second side and has a plurality of perforations longitudinally spaced apart from one another extending between the first side and second side. Each of the plurality of plugs extends axially from an external end to an insertion end with an axially extending outer surface therebetween. The outer surface is non-uniform in diameter in the axial direction and has a substantially cylindrical portion proximate the external end. Each plug is maintained by the substrate in a perforation via friction fit between the substrate and the substantially cylindrical portion with the external end and a portion of the outer surface exposed from the first side of the substrate. The insertion end and a portion of the outer surface is exposed from the second side of the substrate.

In another embodiment, a strip of plugs configured for insertion into a hole in a surface includes a substrate having a plurality of perforations spaced apart from one another in a substantially longitudinal row. Each plug of a plurality of plugs is maintained by a perforation in the substrate. Each plug has an upper portion with a substantially cylindrical outer surface of a first diameter and a lower portion with a reduced diameter smaller than the first diameter. Each plug is maintained by the substrate via friction fit between the substantially cylindrical outer surface of the respective upper portion and the substrate with the reduced diameter of the lower portion exposed from the substrate.

DESCRIPTION OF THE DRAWINGS

FIG. 12 depicts a typical detachment of an end strip from the adjacent strip in the sheet of FIGS. 9-11.

DESCRIPTION OF THE PREFERRED EMBODIMENT

With reference to the drawings wherein like numerals represent like parts throughout the Figures, a collated strip of plugs for use in concealing holes in trim or like structures and a corresponding method of installation is disclosed.

Figure 1:
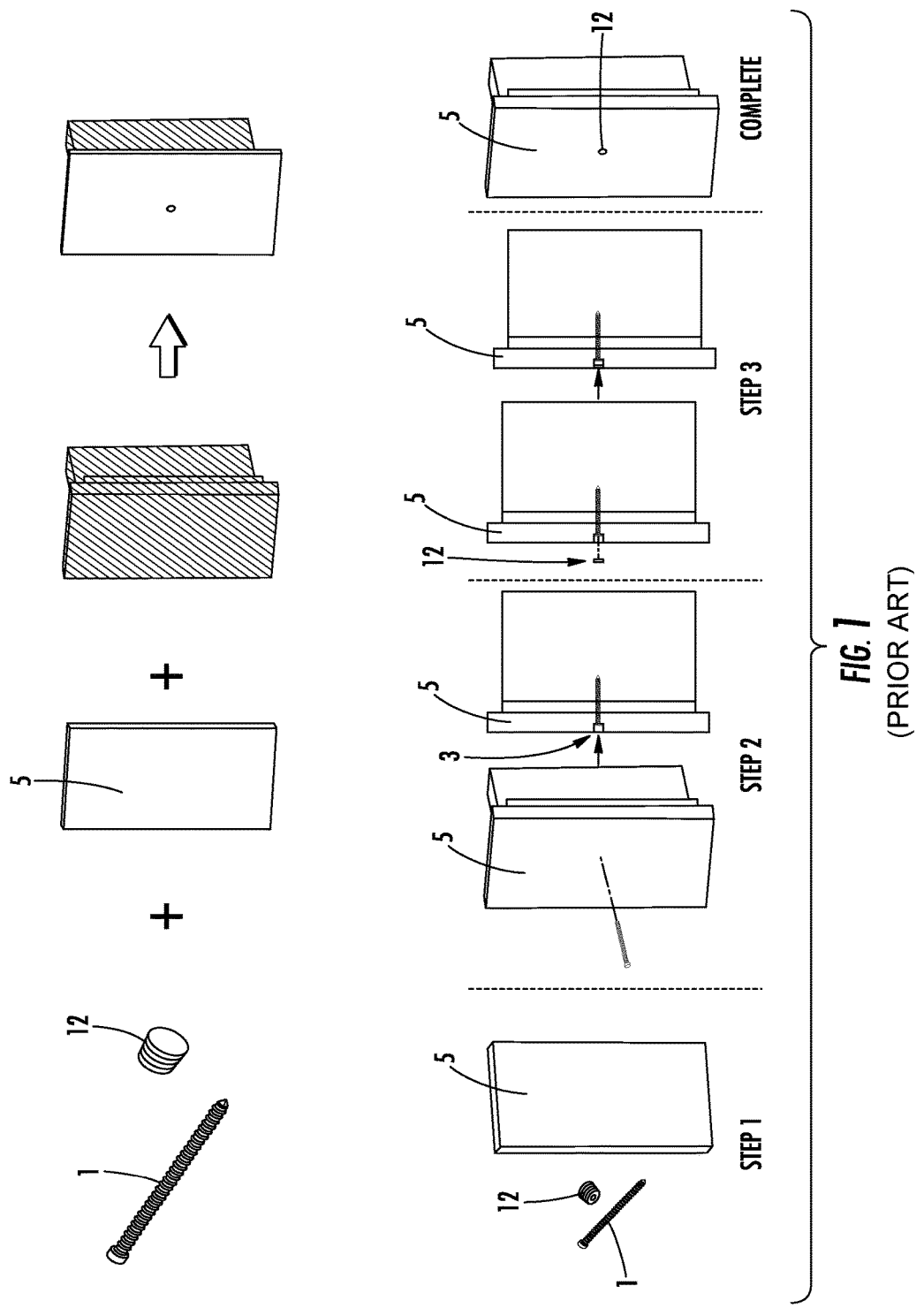
FIG. 1 is a general depiction of a prior art plug installation process and materials with which loose plugs are typically used.

FIG. 1 shows one currently employed method of trim installation, including the step of concealing the recess left by the screw hole with a loose plug 10 (typically having a matching surface to the surrounding trim 3 or like surface). The screw or nail 1 is installed by driving the screw or nail into the trim 3 leaving a bore 5 above its head. A plug 12 is placed into the bore and tapped in until its outer end face is flush with the outer surface of the exterior member such as trim 3.

Figure 2:
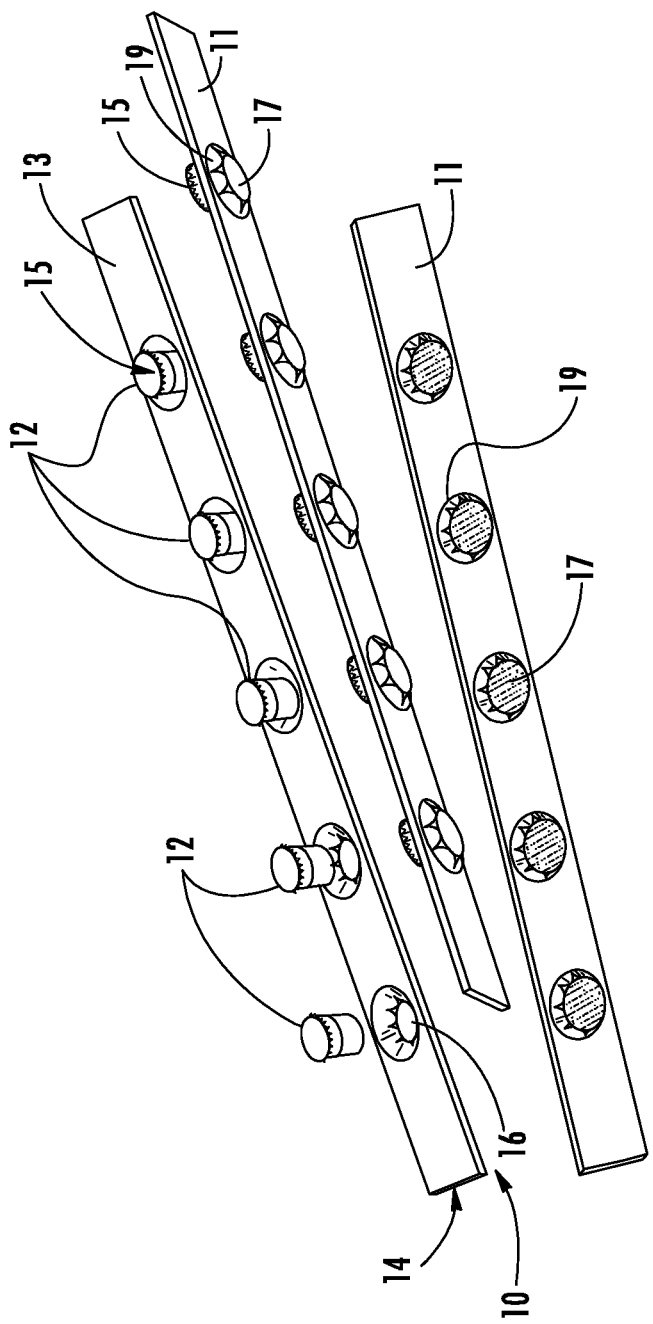
FIG. 2 is a perspective view of an embodiment of the disclosed collating strip for plugs.

FIG. 2 shows an embodiment of the disclosed collating plug strip 10 with a plurality of associated plugs 12 engaged with an elongate strip 14. The strip has an upper surface 11 and bottom surface 13. This embodiment of the plug strip 10 includes pre-punched perforations 16 at predetermined positions along the length of the elongate strip 14. Each perforation 16 is configured to rigidly or semi-rigidly engage a plug 12, as shown most clearly in the middle strip in FIG. 2. In a preferred embodiment, the strip 14 is a polymeric material that has a relatively translucent or clear appearance and is somewhat flexible (i.e. not a rigid plastic). However, additional strips may be made from paper, cardboard, cloth, or the like.

The plugs 12 have an insertion end 15 that is adapted to be inserted in the screw hole and an external end 17 having a finished end surface which is exposed when the plug 12 is inserted. The plugs 12 are inserted into the perforations 16 finished end surface first. The perforations 16 have their inner side edges 19 turned downward and inward as shown in FIG. 2 to frictionally grasp the plugs 12.

As shown best in the middle strip 10 of FIG. 2, the strip 14 and plugs 12 are engaged with at least a portion of the "insertion end" 15 of the plugs projecting from the bottom surface 13 of the strip 14. As shown in the bottom strip 10 of FIG. 2, the plugs 12 can be positioned in the strip 14 with the respective grains on the surface of the exposed end 17 being in alignment.

The collating strip 10 allows easy handling of numerous plugs 12 without the drawbacks discussed above. After attachment of a trim board or like member with a screw, a user can grip the strip 14 and position a plug 12 within the fastener recess/hole (with surface grains aligned). In the embodiment depicted in FIG. 2, a user can tap or otherwise push the plug 12 into the hole and then dislodge the strip 14. The separated plug 12 can be tapped additionally to effect a flush mating with the surface of the trim.

Embodiments of the disclosed strips 10 may be provided wherein the engaged plugs 12 are positioned at predetermined lengths along the strip 14 that substantially correspond to the positions of pre-cut holes or recesses in the trim surface. This configuration allows a user to align the plug strip 10 with numerous individual plugs 12 aligned with a separate recess, and then install the plugs 12 in a single step, without having to access or move the strips numerous times for the same trim surface.

Figure 3:
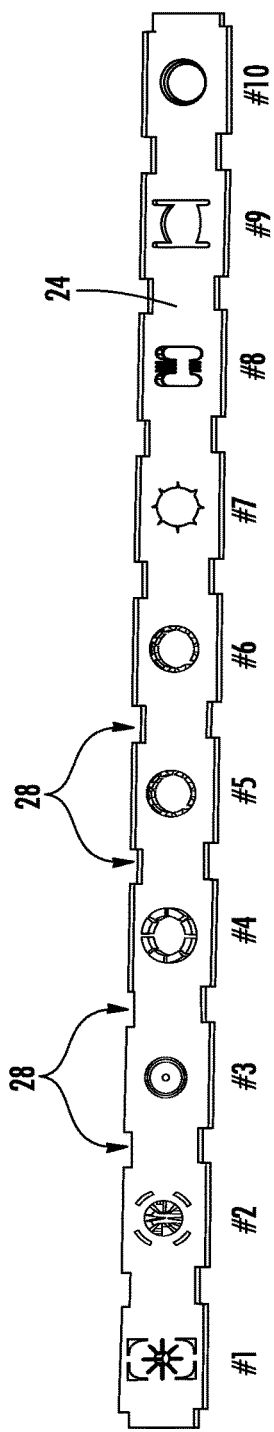
FIG. 3 shows another embodiment of the collating strip for plugs having edge notches for alignment with a surface and/or feeding with an attachment tool and showing various geometries of shapes for the perforations.
Figure 4:
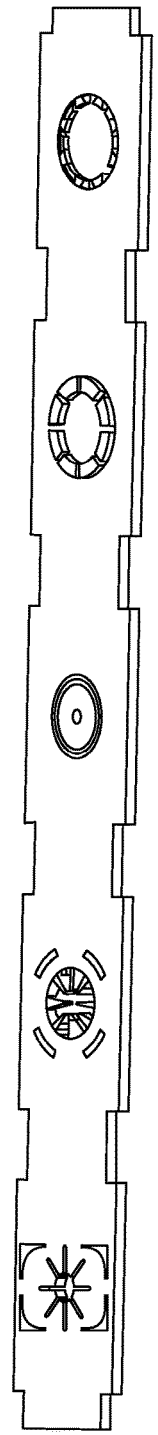
FIG. 4 shows a close up view of the strip of FIG. 3, depicting the various geometries of perforations.

FIGS. 3 and 4 depict an additional embodiment of a strip 24. As shown, this embodiment includes a plurality of spaced registry notches 28 spaced along each longitudinal edge of the strip 24. As will be discussed in further detail below, the registry notches 28 can assist alignment of the strip with a trim surface, and also assist in engagement with an automatic or semiautomatic feeding and attachment tool. FIGS. 3 and 4 also show numerous embodiments of perforations, indentations or holes in the substrate 24 that can be used to engage and maintain standard shaped plugs therewith. The perforations can also be shaped to adapt to numerous different shapes of plugs, if desired.

Figure 5:
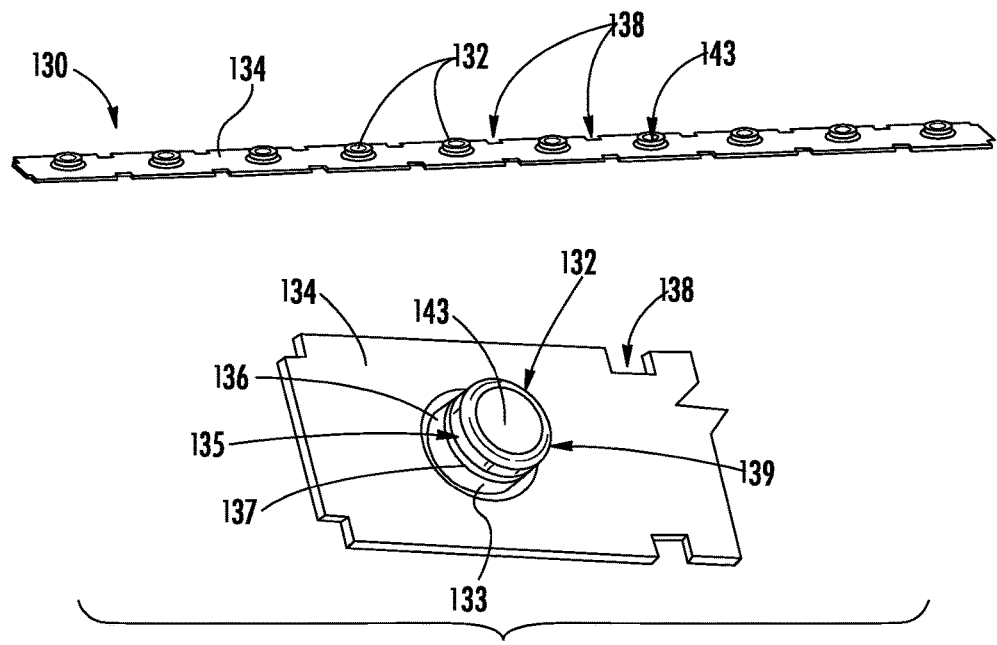
FIG. 5 shows a bottom perspective view of a collating strip for plugs according to another embodiment.

FIG. 5 shows the bottom side of another plug strip 130, which includes a plurality of plugs 132 engaged within perforations 126 in a notched strip 134. Typically, each registry notch 138 is positioned on a longitudinal edge of the strip 134 opposite a registry notch 138 on the opposite edge of the strip. The registry notches 138 are also typically spaced longitudinally a uniform distance from each other along the respective edges. In this embodiment, the strip 134 extends longitudinally with the perforations 136 and associated plugs 132 being positioned longitudinally between the registry notches 138. This relationship assists a more facile alignment and/or longitudinal advancement of the strip 130 on a surface or through an automatic feeding and attachment tool. The perforations 136 are preferably oval as shown particularly in FIG. 7 although other shapes may be used.

As shown particularly in FIGS. 5, 6, 10 and 11, the plug 132, 232 may include an upper enlarged cylindrical portion 133, 233, a lower reduced cylindrical portion 135, 235 and a tapered transition portion 137, 237 between the upper enlarged cylindrical portion 133, 233 and the lower reduced cylindrical portion 135, 235. The lower reduced cylindrical portion 135, 235 may have a taper 139, 239 at its end portion. The outer face of the enlarged cylindrical portion 135, 235 is the external end having a finished end surface 141 and the end of the lower cylindrical portion 137, 237 is the insertion end 143. See U.S. Pat. No. 8,104,248, the entire disclosure of which is incorporated by referral herein in its entirety, for a disclosure of various types of plugs that may be used.

Figure 6:
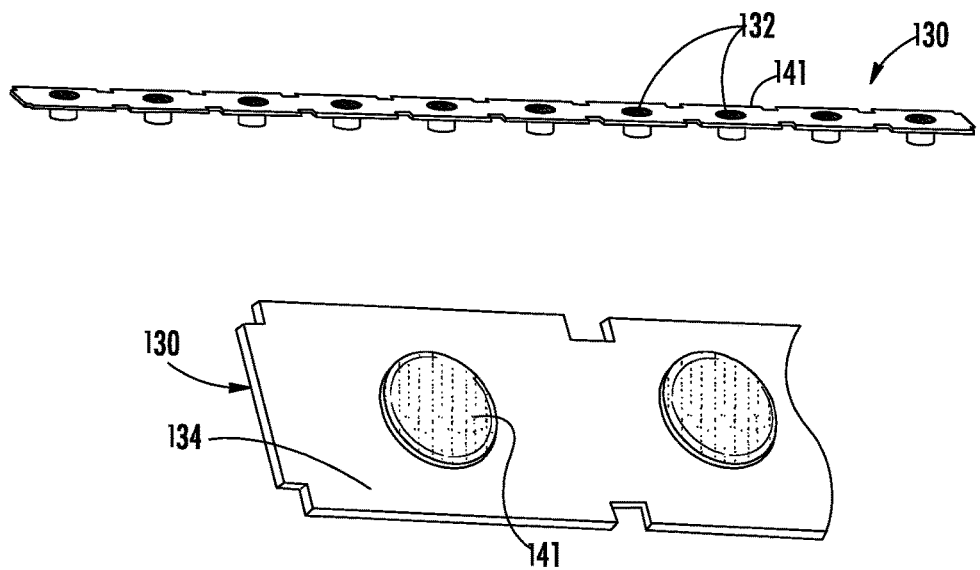
FIG. 6 shows the collating strip of FIG. 5 from the top side.

FIG. 5 shows the insertion end 43 of each plug 132 projecting above the bottom surface 145 of the strip 134, which allows easy insertion into a recess or bore in trim or a similar surface material. FIG. 6 depicts the reverse or top side of the FIG. 5 view, showing the "finished" end surface 141 of the plugs 132. As shown, the finished end 141 may project very slightly beyond the surface of the strip 134, but this is not a necessary relationship. The individual plugs 132 can be inserted into a trim recess and the strip 134 can be dislodged without contact with the finished end of the plug 132. An embodiment may be provided wherein a removable covering or wrapper extending along the side of the substrate with the finished ends of the plugs to protect the finish.

The FIGS. 5 and 6 embodiment features engagement of the plugs 132 with the strip 134 via a relatively light frictional engagement within the strip perforations. The perforations 126 engage the upper enlarged cylindrical portion 133 of the plug 130. Additional embodiments may be provided which employ a mild adhesive either alone or in combination with frictional forces to engage or assist engagement of the plugs with the substrate.

Figure 7:
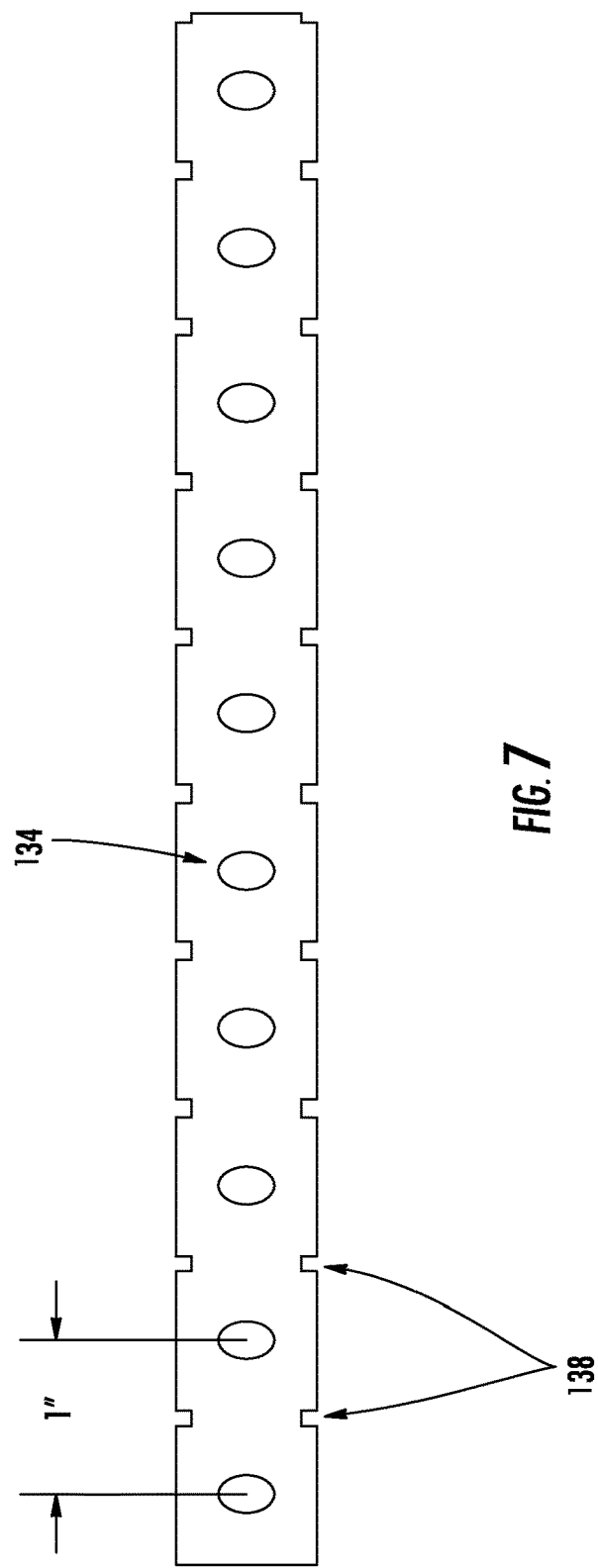
FIG. 7 is a plan view of the strip of FIGS. 5 and 6, showing the spacing and use of edge notches as registry locations for use with an installation tool.

FIG. 7 shows a plan view of the notched strip of FIGS. 5 and 6. This view shows a spacing distance of approximately 1.0 inch between the centers of each successive plug 132 along the strip 134. However, the spacing can be varied as desired for different sized plugs and different configurations of substrate. A preferred range of distances is 0.20 inches to 2.0 inches, with a particularly preferable distance of approximately 0.5 inches. As shown and discussed above, the registry notches 138 are disposed along each longitudinal edge of the substrate 134 in an opposing configuration. These registry notches 138 each have substantially the same size and shape, but these characteristics may vary, for instance, for different configurations of attachment and feeding tools. The strip 130 may come wrapped in a coil configuration for advantageous packaging, storage and use.

Figure 8:
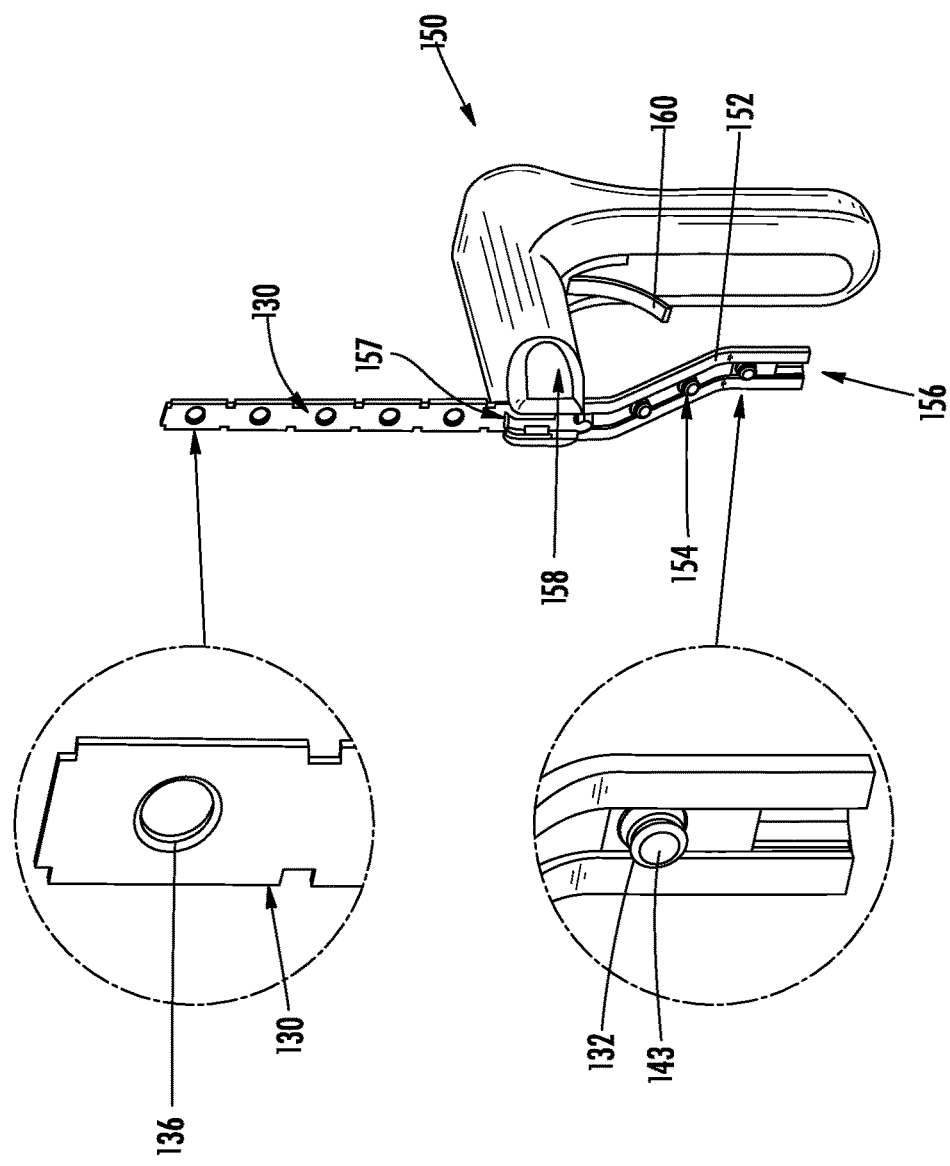
FIG. 8 shows a hand held installation tool for use with the disclosed collating strip for plugs of FIGS. 5-7 and the corresponding method of use.

FIG. 8 depicts an embodiment of a semi-automatic installation device or tool 150 for use with the disclosed strip, like that depicted as reference numeral 130. The installation device 150 includes an elongated track 152 that defines a front opening 154 extending the entire length of the track. Also defined by the track 152 are a lower opening 156 and an upper opening 157, each sized and shaped to allow an end of the strip 130 to pass through. The track 152 is preferably a rigid material such as a metal or a hard plastic. The track 152 is configured to receive and slidably maintain the strip 130 with the insertion ends 115 of the plugs 132 within the front opening 154, as shown in the lower exploded window in FIG. 8.

The installation device 150 also includes an advancement and attachment mechanism, positioned within the housing portion shown generally as reference numeral 158 in FIG. 8. The attachment mechanism includes a plunger or similar item (not shown) that reciprocates generally perpendicular to the strip portion in front of the plunger. One embodiment of the device 150 may include an advancement mechanism with a toothed-wheel configuration. The teeth of the wheel are sized, shaped and positioned generally to engage with the notches 138 on the strip substrate 134.

A user typically feeds the strip 130 upward through the track 152 until the teeth engage with a front set of the notches 138. When a plug 132 is advanced in front of the plunger, a user can position the plug 132 within a trim recess or bore, and then pull the device trigger 160 which effects reciprocation of the plunger outward, thereby dislodging the plug 132 from the substrate 134 and installing it within the recess. Thereafter, the toothed wheel rotates upward (clockwise in the view of FIG. 8) a predetermined angle, advancing the strip 130 upward into position with the next plug 132 in front of the plunger ready for the next installation. As shown in the upper exploded circle in FIG. 8, the empty strip 134 material exits the upper end of the track 152. The described toothed wheel and plunger is a non-limiting example of an advancement and attachment mechanism that is suited for use with the disclosed strip 130.

Figure 9:
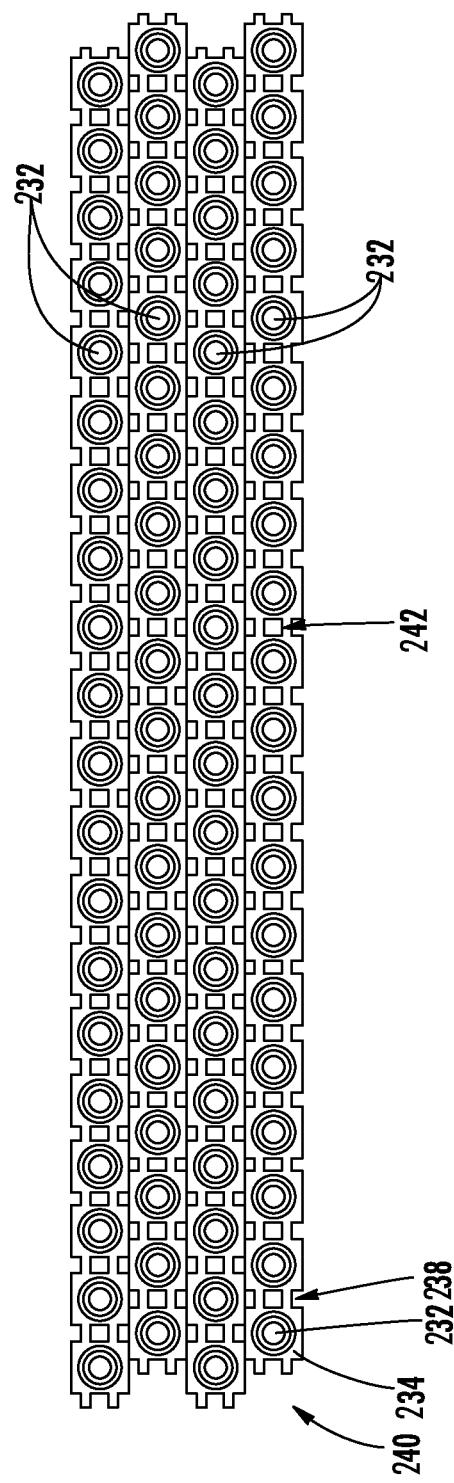
FIG. 9 is another embodiment of the disclosed collating strip for plugs in a quad sheet form.

FIG. 9 shows a plurality of collating plug strips 230 joined at adjacent longitudinal edges to form a sheet 240. Here, the sheet 240 includes four parallel longitudinally extending strips 230 joined in an alternating offset alignment (i.e., a "quad sheet"). It is to be understood that any number of rows may be provided. Each strip 230 is attached to an adjacent strip 230 with the plugs 232 of each respective adjacent strip longitudinally aligned with the intermediate portion of strip 234 between plugs 232 of the adjacent strip. This described configuration likewise results in the registry notches 238 and relief notches 242 in the strip 234 being longitudinally offset from the corresponding notches of the adjacent strip(s). As shown, alternating strips 230 in the sheet 240 are substantially longitudinally aligned. FIG. 9 also shows a non-limiting example of the dimensions of an embodiment of the sheet 240 (in inches).

Figure 10:
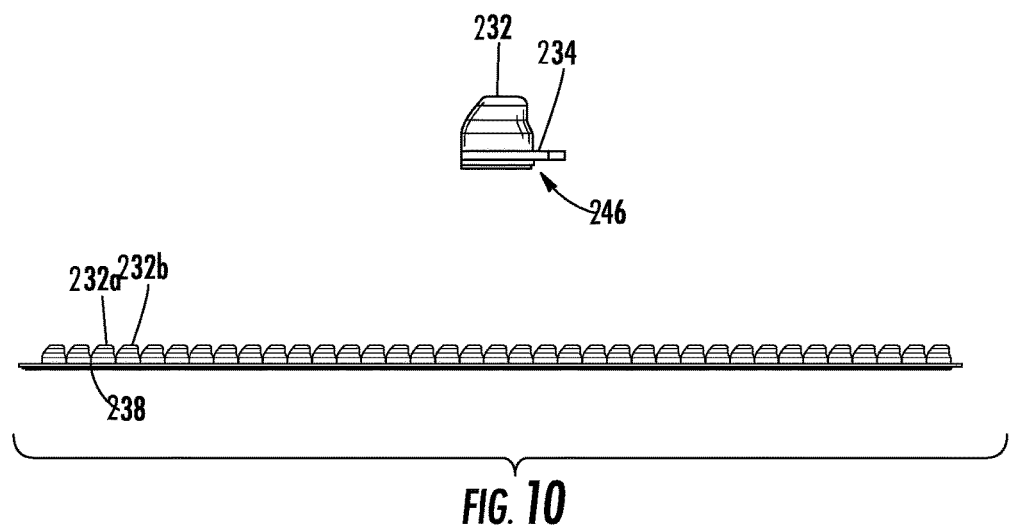
FIG. 10 is a side elevation view of the quad sheet of the collating strip for plugs of FIG. 9 and an enlarged elevation view of an end plug thereof.

The side elevation view of the sheet 240 shown in FIG. 10 depicts the alternating arrangement of adjacent strips 230. The end strip plugs 232a are longitudinally offset from the adjacent (rear) strip plugs 232b. The enlarged portion of a plug 232 (detail B) shows preferred dimensions and a plastic retaining element 246 which may be included for assisting securement of a plug 232 within a perforation in the substrate 234.

The registry notches 238 are positioned to facilitate incremental and consistent longitudinal feeding of a strip 230 with an automatic or semi-automatic attachment tool. The relief notches 242 are positioned between each successive plug 232 in a strip 230 to improve flexibility of the strip and/or sheet 240.

Figure 11:
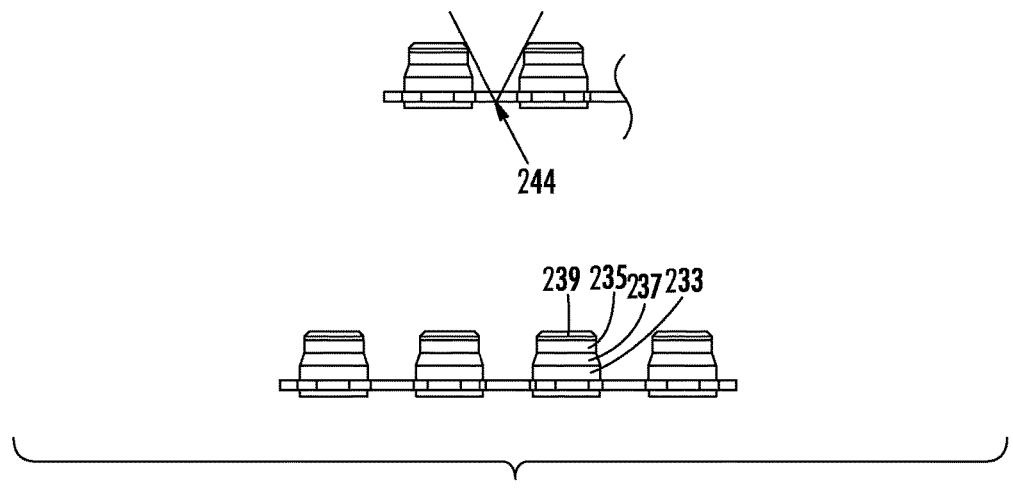
FIG. 11 is an end elevation view of the quad sheet of collated plug strips of FIG. 9 and an enlarged elevation view of plugs from adjacent strips.

As shown in the enlarged end view of FIG. 11 (detail A), the sheet 240 can be manufactured with a V-notch 244 or similar notch in the substrate 234 at the joined interface between longitudinal edges of adjacent strips 230 in the sheet 240. The V-notch 244 assists in facile detachment of adjacent strips by tearing or peeling off. FIG. 11 also indicates a preferred geometry and dimensions.

With reference to FIG. 12, prior to use of a collated strip, an end strip 230 is typically be detached (by "peeling" or "tearing") from the adjacent strip in the sheet 240 and fed into an installation device (like that depicted previously as reference numeral 150) or used for hand installation.

The four-strip configuration of the sheet 240 depicted in FIGS. 9 and 12 is particularly advantageous for manufacturing, packaging, transporting, pre-use handling and strip detachment.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A strip of plugs configured for insertion into a hole in a surface, comprising:
a substrate defining a first side and an opposite second side and having a plurality of perforations longitudinally spaced apart from one another extending between the first side to the second side, each of the plurality of perforations having a closed perimeter; and
a plurality of plugs, each plug extending axially from an external end to an insertion end with an axially extending outer surface therebetween, the outer surface being non-uniform in diameter in the axial direction and having a substantially cylindrical portion proximate the external end, wherein
each plug is maintained by the substrate in a perforation via friction fit between the substrate and the substantially cylindrical portion with the external end and a portion of the outer surface exposed from the first side of the substrate without abutting the first side of the substrate, and the insertion end and a portion of the outer surface exposed from the second side of the substrate.

2. The strip of plugs of claim 1, wherein each plug has a grain configuration.

3. The strip of plugs of claim 2, wherein the grain configuration of each plug is aligned in substantially the same direction with the grain configuration of other plugs when the plugs are maintained by the substrate.

4. The strip of plugs of claim 3, wherein the grain configuration is on a portion of an outer surface of the plugs.

5. The strip of plugs of claim 4, wherein the grain configuration is on a surface of the external end of each plug.

6. The strip of plugs of claim 1, wherein each perforation in the substrate maintains a plug.

7. The strip of plugs of claim 1, comprising opposed registry notches positioned along a lateral edge on either side of said perforations.

8. The strip of plugs of claim 7, wherein each registry notch is spaced longitudinally between said perforations of that strip.

9. The strip of plugs of claim 1, comprising a row of relieve openings in the substrate, the relief openings being spaced from one another and positioned longitudinally between adjacent spaced perforations.

10. The strip of plugs of claim 1, wherein a plug includes a second substantially cylindrical portion proximate the insertion end having a diameter $D_1$ and the substantially cylindrical portion proximate the external end has a diameter $D_2$ that is greater than $D_1$, comprising a tapered transition portion intermediate the respective substantially cylindrical portions.

11. The strip of plugs of claim 1, wherein each perforation is circular and defines a center point, and each perforation is spaced from an adjacent perforation by a distance between approximately 0.5 inches and approximately 1.0 inches measured between the respective center points.

12. The strip of plugs of claim 1, wherein the substrate is configured to be received and advanced longitudinally by a semi-automatic installation device for installation of the plugs into a hole in the surface.

13. The strip of plugs of claim 1, wherein the substrate is flexible.

14. The strip of plugs of claim 1, comprising a removable protective covering extending over the external ends of the plugs.

15. A strip of plugs configured for insertion into a hole in a surface, comprising:
- a substrate having a plurality of perforations spaced apart from one another in a substantially longitudinal row, each of the plurality of perforations having a closed perimeter;
- a plurality of plugs, each plug being maintained by a perforation in the substrate and each plug having an upper portion with a substantially cylindrical outer surface of a first diameter and a lower portion with a reduced diameter smaller than the first diameter, wherein
- each plug is maintained by the substrate via friction fit between the substantially cylindrical outer surface of the respective upper portion and the substrate around the perimeter of the respective perforation with the reduced diameter of the lower portion exposed from the substrate.

16. The strip of plugs of claim 15, wherein each plug has a grain configuration.

17. The strip of plugs of claim 16, wherein the grain configuration of each plug is aligned in substantially the same direction with the grain configuration of other plugs when the plugs are maintained by the substrate.

18. The strip of plugs of claim 17, wherein the grain configuration is on a portion of an outer surface of the plugs.

19. The strip of plugs of claim 15, wherein the substrate is configured to be received and advanced longitudinally by a semi-automatic installation device for installation of the plugs into a hole in the surface.

* * * * *